US009652330B2

(12) United States Patent
Yeh (10) Patent No.: US 9,652,330 B2
(45) Date of Patent: May 16, 2017

(54) METHOD FOR DATA MANAGEMENT AND MEMORY STORAGE DEVICE AND MEMORY CONTROL CIRCUIT UNIT

(71) Applicant: PHISON ELECTRONICS CORP., Miaoli (TW)

(72) Inventor: Chih-Kang Yeh, Kinmen County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 221 days.

(21) Appl. No.: 14/162,784

(22) Filed: Jan. 24, 2014

(65) Prior Publication Data
US 2015/0149702 A1 May 28, 2015

(30) Foreign Application Priority Data
Nov. 28, 2013 (TW) .............................. 102143487 A (51) Int. Cl.
*G06F 12/14* (2006.01)
*G06F 11/14* (2006.01)

(52) U.S. Cl.
CPC ................................ *G06F 11/1441* (2013.01)

(58) Field of Classification Search
CPC ............ G06F 12/0246; G06F 12/0868; G06F 2212/7203; Y10S 707/99953; G11C 14/0036
See application file for complete search history.

(56) References Cited

U.S. PATENT DOCUMENTS

| | | | | |
|---|---|---|---|---|
| 7,610,445 B1* | 10/2009 | Manus | ................ | G06F 12/0804 711/104 |
| 8,527,544 B1* | 9/2013 | Colgrove | .............. | G06F 3/0608 707/791 |
| 8,918,580 B2* | 12/2014 | Cheon | ................. | G06F 12/0871 711/103 |
| 9,009,396 B2* | 4/2015 | Nemazie | ............. | G06F 12/0246 707/639 |
| 2010/0037001 A1* | 2/2010 | Langlois | ............. | G06F 12/0246 711/103 |
| 2013/0042054 A1* | 2/2013 | Jung | .................... | G06F 12/0246 711/103 |
| 2013/0067174 A1* | 3/2013 | Moss | .................. | G06F 11/1076 711/154 |
| 2013/0308433 A1* | 11/2013 | Yulizar | .................. | G11B 27/36 369/53.41 |
| 2014/0136762 A1* | 5/2014 | Li | ........................ | G06F 12/0246 711/103 |
| 2014/0281683 A1* | 9/2014 | Dusija | ................. | G06F 11/0754 714/6.11 |
| 2015/0127922 A1* | 5/2015 | Camp | ................. | G06F 12/0246 711/206 |
| 2015/0135039 A1* | 5/2015 | Mekhanik | ........... | G06F 11/1072 714/773 |

* cited by examiner

*Primary Examiner* — Ryan Bertram
(74) *Attorney, Agent, or Firm* — Jianq Chyun IP Office (57) ABSTRACT

A method for data management and a memory storage device and a memory control circuit unit thereof. The method includes: configuring a NVRAM and a VRAM; storing first data which includes writing data from a host system in the NVRAM; storing second data read from a rewritable non-volatile memory module in the VRAM; when the memory storage device is re-powered on after power failure, reading the first data from the NVRAM, so as to write the writing data into the rewritable non-volatile memory module.

23 Claims, 7 Drawing Sheets

METHOD FOR DATA MANAGEMENT AND MEMORY STORAGE DEVICE AND MEMORY CONTROL CIRCUIT UNIT

CROSS-REFERENCE TO RELATED APPLICATION

This application claims the priority benefit of Taiwan application serial no. 102143487, filed on Nov. 28, 2013. The entirety of the above-mentioned patent application is hereby incorporated by reference herein and made a part of this specification.

BACKGROUND

1. Technology Field

The invention relates to a method for managing data which are stored in a non-volatile random access memory (NVRAM) and a volatile random access memory (VRAM) and a memory storage device and a memory control circuit unit using the method.

2. Description of Related Art

The rapid growth of digital cameras, mobile phones, and MP3 players in recent years leads to a drastic increase in consumers' demand for storage media. A rewritable non-volatile memory module (e.g., a flash memory) is suitable for being embedded in the aforementioned exemplary portable multimedia devices due to having characteristics, such as data non-volatility, low power consumption, small volume, and non-mechanical structure. Generally, non-volatile memory module is operated along with a volatile random access memory (VRAM). For instance, when data is to be written from a host system to a non-volatile memory module, such data is first written into the VRAM and then written into the non-volatile memory module. Through a proper mechanism for data management, the combination of the non-volatile memory module and the VRAM can effectively enhance overall data access speed and operation flexibility.

However, if a power supply problem such as sudden power failure or unstable voltage supply occurs during the process of writing the data from the VRAM to the non-volatile memory module, the data stored in the VRAM may probably be lost, and as a result, the data can not be completely written into the non-volatile memory module. Therefore, some units or individuals may choose to additionally install an uninterruptible power supply (UPS) or a supercapacitor for transferring or backing up a portion of the data in a short time when the power supply problem occurs, for example, all of the data stored in the VRAM is backed up in the non-volatile memory module for reducing loss. However, the maintenance of UPS costs high, and the time for the UPS or the super capacitor supplying the power can not last long, which leads to inconvenience in usage.

Nothing herein should be construed as an admission of knowledge in the prior art of any portion of the invention. Furthermore, citation or identification of any document in this application is not an admission that such document is available as prior art to the invention, or that any reference forms a part of the common general knowledge in the art.

SUMMARY

The invention is directed to a method for data management, a memory storage device and a memory control circuit unit that are capable of effectively recovering data writing error occurring due to a power supply problem in a memory storage device.

The invention is directed to a method for data management for a memory control circuit unit configured to control a rewritable non-volatile memory module. The method includes the following steps. A non-volatile random access memory (NVRAM) and a volatile random access memory (VRAM) are configured. First data is stored in the NVRAM, wherein the first data includes writing data from a host system. Second data read from the rewritable non-volatile memory module is stored in the VRAM. When a memory storage device is re-powered on after a power failure, the first data is written into the rewritable non-volatile memory module from the NVRAM.

The invention is further directed to a memory storage device. The memory storage device includes a connection interface unit, a rewritable non-volatile memory module, a memory control circuit unit, a NVRAM and a VRAM. The connection interface unit is configured to be coupled to a host system. The memory control circuit unit is coupled to the connection interface unit, the NVRAM, the VRAM and the rewritable non-volatile memory module. The memory control circuit unit is configured to store first data in the NVRAM, wherein the first data includes writing data from the host system. The memory control circuit unit is further configured to store second data read from the rewritable non-volatile memory module in the VRAM. When the memory storage device is re-powered on after a power failure, the memory control circuit unit is further configured to write the first data into the rewritable non-volatile memory module from the NVRAM.

Additionally, the invention is directed to a memory control circuit unit. The memory control circuit unit is configured to control a rewritable non-volatile memory module. The memory control circuit unit includes a host interface, a memory interface, an NVRAM, a VRAM and a memory management circuit. The host interface is configured to be coupled to a host system. The memory interface is configured to be coupled to the rewritable non-volatile memory module. The memory management circuit is coupled to the host interface, the memory interface, the NVRAM, and the VRAM. The memory management circuit is configured to store first data in the NVRAM, wherein the first data comprises writing data from the host system. The memory management circuit is further configured to store second data read from the rewritable non-volatile memory module in the VRAM. When a memory storage device is re-powered on after a power failure, the memory management circuit is further configured to write the first data into the rewritable non-volatile memory module from the NVRAM.

Based on the above, in the method for data management, the memory storage device and the memory control circuit unit of the invention, only the first data with higher importance is stored in the NVRAM, and the second data with lower importance is stored in the VRAM. When the power supply problem such as sudden power failure or unstable voltage supply occurs, the first data stored in the NVRAM can be served for recovery.

It should be understood, however, that this Summary may not contain all of the aspects and embodiments of the invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Embodiments of the invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally, a memory storage device (i.e., a memory storage system) includes a rewritable non-volatile memory module and a controller (i.e., a control circuit). The memory storage device is commonly used together with a host system so that the host system can write data into or read data from the memory storage device.

Figure 1:
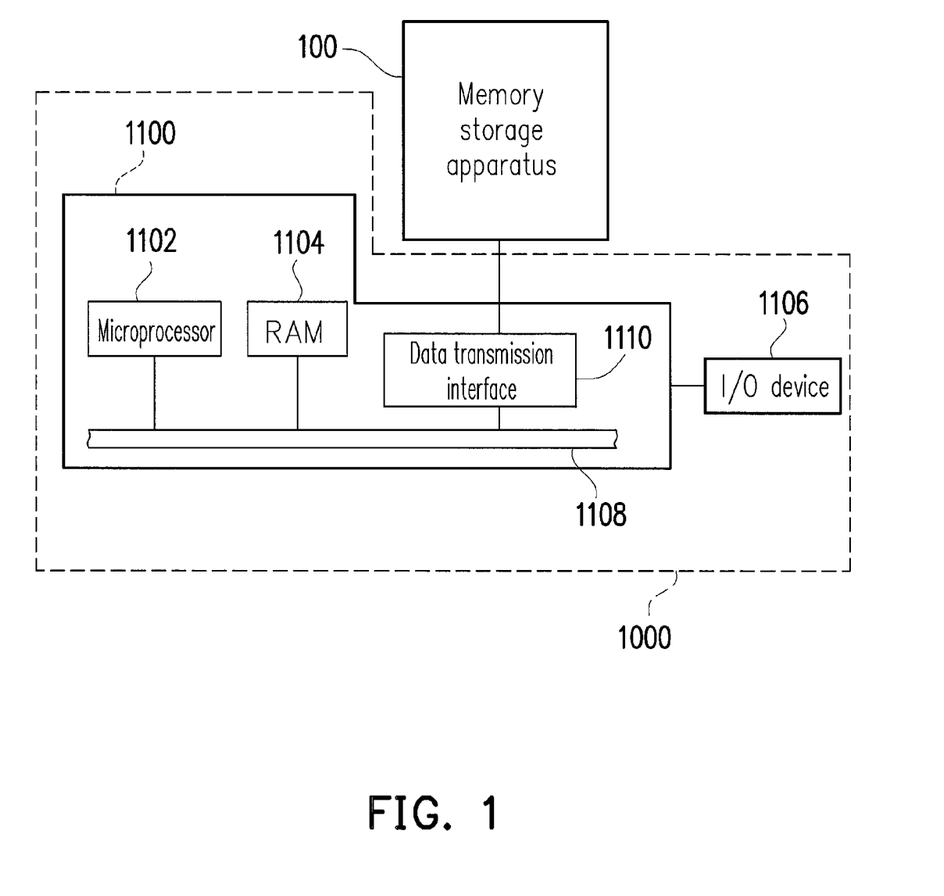
FIG. 1 illustrates a host system and a memory storage device according to an exemplary embodiment of the invention.

FIG. 1 illustrates a host system and a memory storage device according to an exemplary embodiment of the invention.

Figure 2:
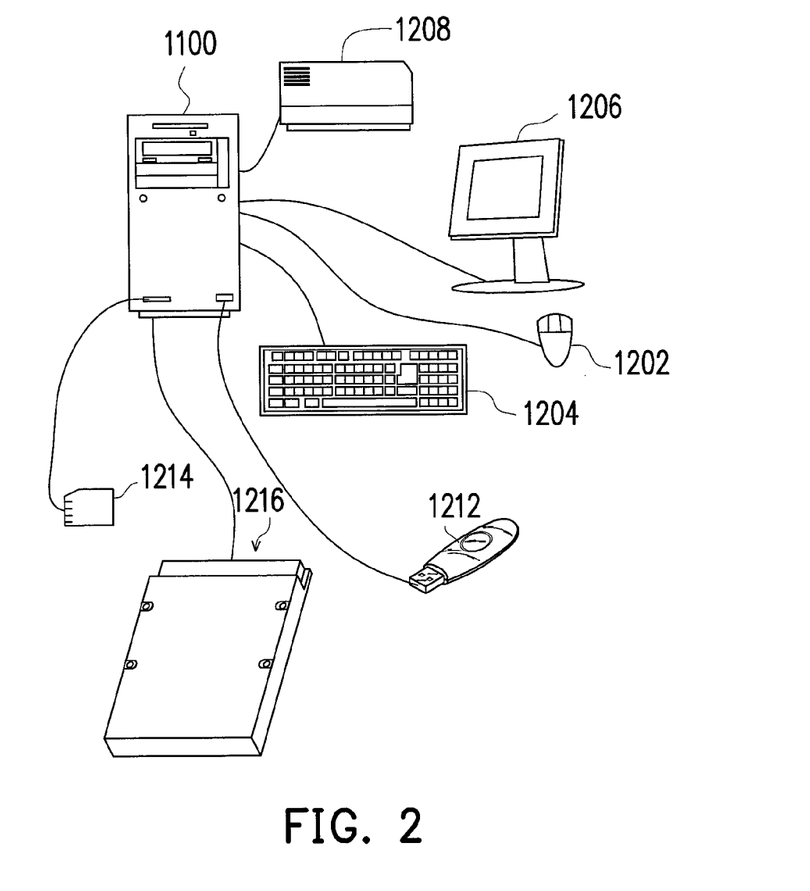
FIG. 2 is a schematic diagram illustrating a computer, an input/output (I/O) device, and a memory storage device according to an exemplary embodiment of the invention.

With reference to FIG. 1, a host system 1000 generally includes a computer 1100 and an input/output (I/O) device 1106. The computer 1100 includes a microprocessor 1102, a random access memory (RAM) 1104, a system bus 1108 and a data transmission interface 1110. The I/O device 1106 includes a mouse 1202, a keyboard 1204, a display 1206, and a printer 1208 as shown in FIG. 2. It should be noted that the device illustrated in FIG. 2 constructs no limitation to the I/O device 1106, and the I/O device 1106 may further include other devices.

In the exemplary embodiment of the invention, the memory storage device 100 is coupled to the other devices of the host system 1000 through the data transmission interface 1110. By operating the microprocessor 1102, the RAM 1104 and the I/O device 1106, data can be written into the memory storage device 100 or can be read from the memory storage device 100. For example, the memory storage device 100 may be a rewritable non-volatile memory storage device, such as a flash drive 1212, a memory card 1214, or a solid state drive (SSD) 1216 shown in FIG. 2.

Figure 3:
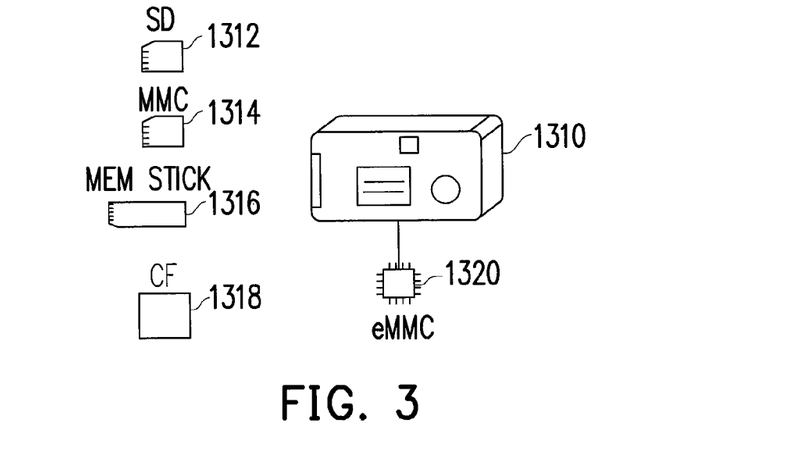
FIG. 3 is a schematic diagram illustrating a host system and a memory storage device according to an exemplary embodiment of the invention.

Generally, the host system 1000 accompanied with the memory storage device 100 can substantially be any system capable of storing data. Even though the host system 1000 is described as a computer system in the exemplary embodiment, in another exemplary embodiment of the invention, the host system 1000 may also be a system such as a digital camera, a video camera, a communication device, an audio player, or a video player. For example, if the host system is a digital camera (video camera) 1310, the rewritable non-volatile memory storage device is then an SD card 1312, an MMC card 1314, a memory stick 1316, a CF card 1318 or an embedded storage device 1320 (as shown in FIG. 3). The embedded storage device 1320 includes an embedded MMC (eMMC). It should be noted that the eMMC is directly coupled to the substrate of the host system.

Figure 4:
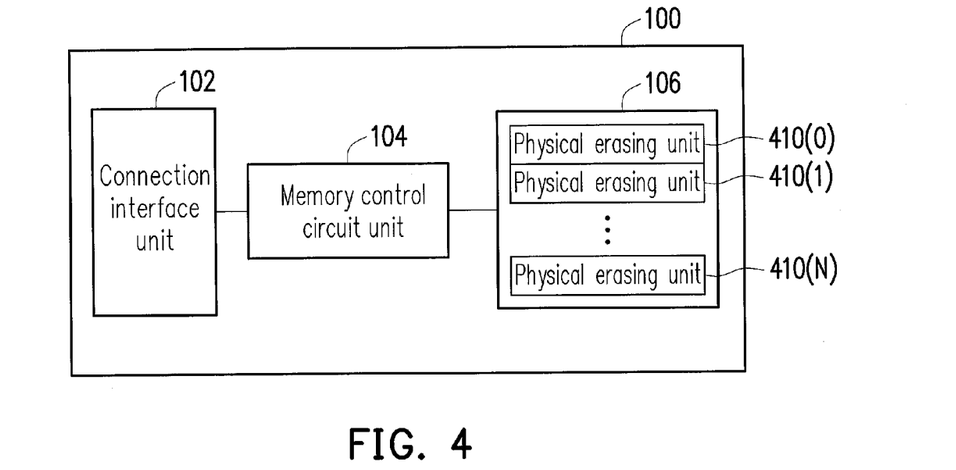
FIG. 4 is a schematic block diagram of the memory storage device illustrated in FIG. 1.

FIG. 4 is a schematic block diagram of the memory storage device illustrated in FIG. 1.

With reference to FIG. 4, the memory storage device 100 includes a connection interface unit 102, a memory control circuit unit 104, and a rewritable non-volatile memory module 106.

In the present exemplary embodiment, the connection interface unit 102 complies with a serial advanced technology attachment (SATA) standard. However, it should be understood that the invention is not limited thereto, and the connection interface unit 102 may also comply with a parallel advanced technology attachment (PATA) standard, an institute of electrical and electronic engineers (IEEE) 1394 standard, a peripheral component interconnect express (PCI Express) standard, a universal serial bus (USB) standard, an ultra high speed-I (UHS-I) interface standard, an ultra high speed-ii (UHS-II) interface standard, a secure digital (SD) interface standard, a memory stick (MS) interface standard, a multi-media-card (MMC) interface standard, a compact flash (CF) interface standard, an integrated device electronics (IDE) interface standard or other suitable types of standards. In the present exemplary embodiment, the connection interface unit 102 may be packaged with the memory control circuit unit 104 in a chip or disposed outside a chip containing the memory control circuit unit 104.

The memory control circuit unit 104 is configured to execute a plurality of logical gates or control commands implemented in a hardware form or a firmware form and performs operations such as data writing, reading, and erasing in the rewritable non-volatile memory module 106 according to commands from the host system 1000.

The rewritable non-volatile memory module 106 is coupled to the memory control circuit unit 104 and configured to store data written by the host system 1000. The rewritable non-volatile memory module 106 has physical erasing units 410(0) to 410(N). For example, the physical erasing unit 410(0) to 410(N) may belong to the same memory die or different memory dies. Each physical erasing unit has a plurality of physical programming units, and the physical programming units that belong to the same physical erasing unit may be written independently and be erased simultaneously. In the present exemplary embodiment, each physical erasing unit consists of 64 physical programming units. However, in other exemplary embodiments of the invention, each physical erasing unit may consist of 128, 256 or any other number of physical programming units.

To be more detailed, one physical erasing unit is the smallest erasing unit. Namely, each physical erasing unit contains the least number of memory cells that are erased together. One physical programming unit is the smallest programming unit. Namely, each physical programming unit is the smallest unit for writing data. Each physical programming unit commonly includes a data bit area and a redundant bit area. The data bit area includes a plurality of physical access addresses for storing user data, and the redundant bit area is used for storing system data (e.g., control information and error correcting codes). In the present exemplary embodiment, the data bit area of each physical programming unit includes 4 physical access addresses, and the size of each of the physical access addresses is 512 bytes. However, in other exemplary embodiments, the data bit area may also include a greater or smaller number of physical access addresses, and the invention is not intent to limit the size and the number of the physical access addresses. For example, in an exemplary embodiment, the physical erasing units may refer to physical blocks, and the physical programming units may refer to physical pages or physical sectors, but the invention is not limited thereto.

In the present exemplary embodiment, the rewritable non-volatile memory module 106 is a multi-level cell (MLC) NAND flash memory module (i.e., a flash memory module capable of storing data of at least 2 bits in one memory cell). However, the invention is not limited thereto, and the rewritable non-volatile memory module 106 may also be a single-level cell (SLC) NAND flash memory module (i.e., a flash memory module capable of storing data of 1 bit in one memory cell), a trinary-level cell (TLC) NAND flash memory module (i.e., a flash memory module capable of storing data of 3 bits in one memory cell), any other flash memory module, or any other memory module with the same characteristics.

Figure 5:
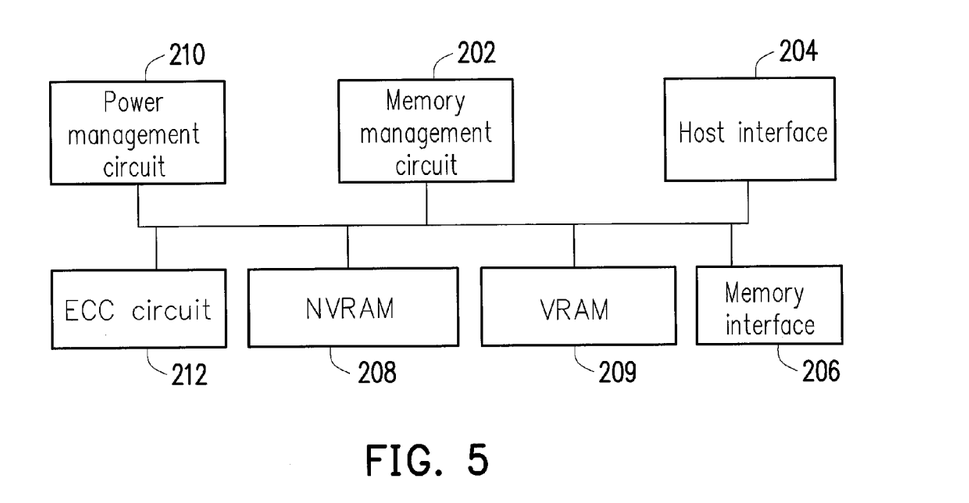
FIG. 5 is a schematic block diagram of a memory control circuit unit according to an exemplary embodiment of the invention.

FIG. 5 is a schematic block diagram of a memory control circuit unit according to an exemplary embodiment of the invention.

With reference to FIG. 5, the memory control circuit unit 104 includes a memory management circuit 202, a host interface 204, and a memory interface 206, a non-volatile random access memory (NVRAM) 208 and a volatile random access memory (VRAM) 209.

The memory management circuit 202 is configured to control the overall operation of the memory control circuit unit 104. Particularly, the memory management circuit 202 has a plurality of control instructions, and when the memory storage device 100 is in operation, the control instructions are executed to perform data writing, reading, and erasing operations.

In the present exemplary embodiment, the control instructions of the memory management circuit 202 are implemented in a firmware form. For instance, the memory management circuit 202 has a microprocessor unit (not shown) and a read-only memory (ROM, not shown), and these control instructions are burnt into the ROM. When the memory storage device 100 is in operation, the control instructions are executed by the microprocessor unit to perform operations, such as data writing, data reading and data erasing.

In another exemplary embodiment of the invention, the control instructions of the memory management circuit 202 are stored in a specific area of the rewritable non-volatile memory module 106 (for instance, a system area of the memory module exclusively used for storing system data) as program codes. Additionally, the memory management circuit 202 has a microprocessor unit (not shown), a ROM (not shown), and a random access memory (RAM). In particular, the ROM has boot codes, and when the memory control circuit unit 104 is enabled, the microprocessor unit first executes the boot codes to load the control instructions from the rewritable non-volatile memory module 106 into the RAM of the memory management circuit 202. The microprocessor unit then runs the control instructions to write, read, and erase data.

Moreover, in another exemplary embodiment, the control instructions of the memory management circuit 202 may also be implemented in a hardware form. For example, the memory management circuit 202 includes a microcontroller, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the microcontroller. The memory cell management circuit is configured to manage physical erasing units of the rewritable non-volatile memory module 106, the memory writing circuit configured to issue a writing command to the rewritable non-volatile memory module 106 to write data thereto, the memory reading circuit is configured to issue a reading instruction to the rewritable non-volatile memory module 106 to read data therefrom, the memory erasing circuit is configured to issue an erasing instruction to the rewritable non-volatile memory module 106 to erase data therefrom, and the data processing circuit is configured to process data to be written to the rewritable non-volatile memory module 106 or data read from the rewritable non-volatile memory module 106. The description with respect to the memory management circuit 202 below may be directly or indirectly applied to the memory control circuit unit 104.

The host interface 204 is coupled to the memory management circuit 202 and configured to receive and identify commands and data transmitted by the host system 1000. Namely, the commands and data from the host system 1000 are transmitted to the memory management circuit 202 through the host interface 204. In the present exemplary embodiment, the host interface 204 complies with the SATA standard. However, it should be understood that the invention is not limited thereto, and the host interface 204 may comply with the PATA standard, the IEEE 1394 standard, the PCI Express standard, the USB standard, the UHS-I interface standard, the UHS-II interface standard, the SD standard, the MS standard, the MMC standard, the CF standard, the IDE standard, or other suitable data transmission standard.

The memory interface 206 is coupled to the memory management circuit 202 and configured to access the rewritable non-volatile memory module 106. Namely, data to be written into the rewritable non-volatile memory module 106 may be converted by the memory interface 206 into a format acceptable to the rewritable non-volatile memory module 106.

The NVRAM 208 is coupled to the memory management circuit 202 and configured to temporarily store data from the host system 1000. In an exemplary embodiment, the NVRAM 208 may also temporarily store data from the rewritable non-volatile memory module 106. The NVRAM 208 is a random access memory (RAM) that does not lose the stored data due to power off or unstable voltage supply, such as a magnetoresistive random access memory (MRAM).

The VRAM 209 is coupled to the memory management circuit 202 and configured to temporarily store data from the rewritable non-volatile memory module 106. The VRAM 209 is a RAM that may lose the stored data due to power off or unstable voltage supply, such as a dynamic random access memory (DRAM) and a static random access memory (SRAM)) Additionally, the performance (e.g., a data accessing speed) of the NVRAM 208 generally is higher that the performance of the VRAM 209. When referring to cost, the cost (e.g., the price and/or manufacturing cost) of the NVRAM 208 generally is also higher than the cost of the VRAM 209. In the present exemplary embodiment, the capacity of the VRAM 209 is at least two times (e.g., two to ten times) or other times as big as the capacity of the NVRAM 208.

The NVRAM 208 and the VRAM 209 are configured by the memory management circuit 202. In the present exemplary embodiment, the NVRAM 208 and the VRAM 209 is implemented in the memory control circuit unit 104 in a chipset form or a system on chip (SoC) form. However, the NVRAM 208 and/or the VRAM 209 may be separated from and coupled to the memory control circuit unit 104, which is not limited in the invention.

In the present exemplary embodiment, the NVRAM 208 and the VRAM 209 is coupled to the memory management circuit 202 through a double data rate (DDR) interface or a similar memory connection interface. Alternatively, in an exemplary embodiment, the NVRAM 208 and the VRAM 209 are coupled to the memory management circuit 202 through respective memory connection interface.

In an exemplary embodiment, the memory control circuit unit 104 further includes a power management circuit 210 and an error checking and correcting (ECC) circuit 212.

The power management circuit 210 is coupled to the memory management circuit 202 and configured to control the power supply of the memory storage device 100.

The ECC circuit 212 is coupled to the memory management circuit 202 and configured to perform an ECC procedure to ensure data accuracy. To be specific, when the memory management circuit 202 receives a writing command from the host system 1000, the ECC circuit 212 generates an ECC code for data corresponding to the writing command, and the memory management circuit 202 writes the data and the corresponding ECC code into the rewritable non-volatile memory module 106. Thereafter, when reading the data from the rewritable non-volatile memory module 106, the memory management circuit 202 simultaneously reads the ECC code corresponding to the data, and the ECC circuit 212 performs the ECC procedure on the read data according to the corresponding ECC code.

Figure 6:
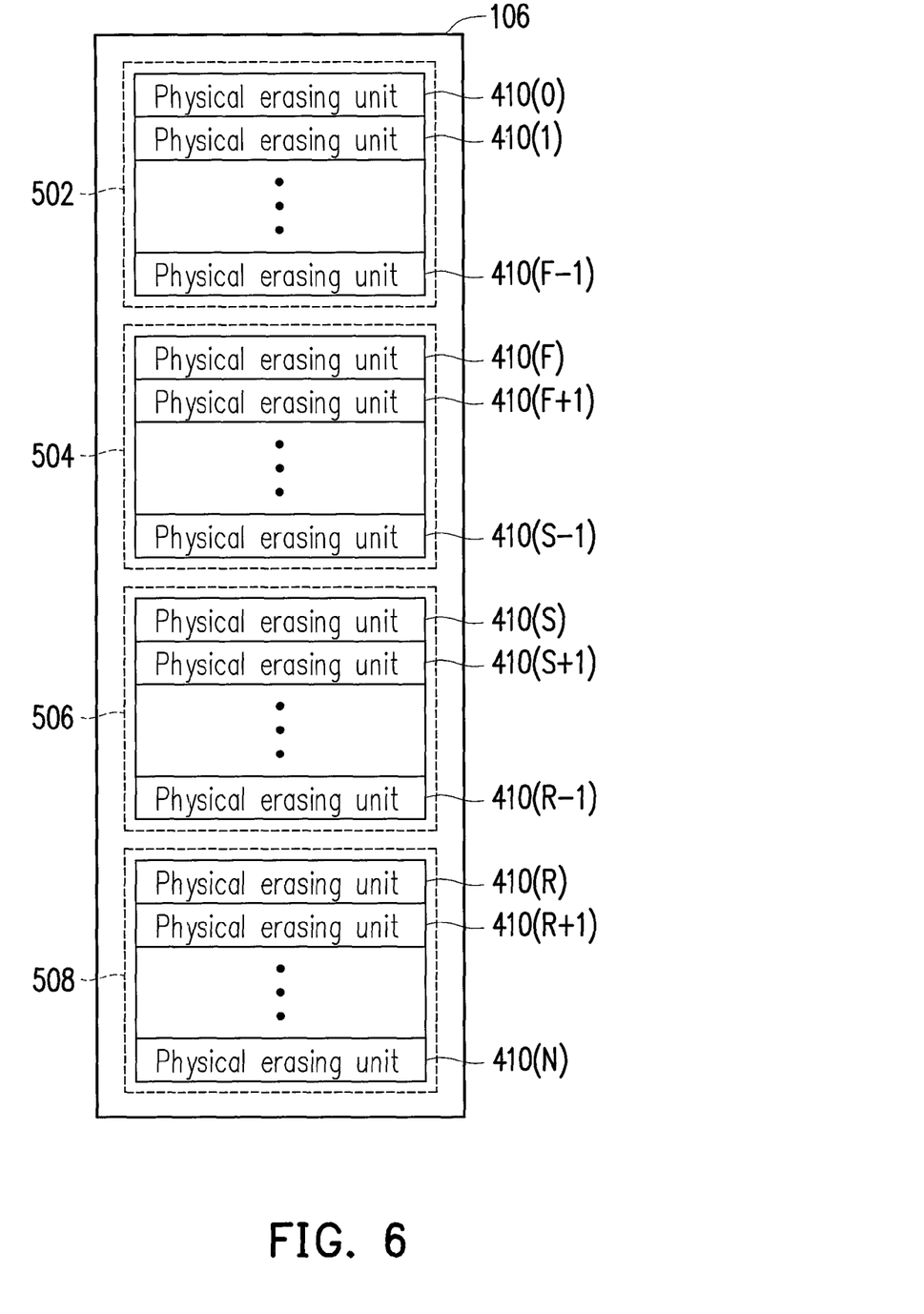
FIG. 6 and FIG. 7 are exemplary schematic diagrams of managing a physical erasing unit according to an exemplary embodiment of the invention.
Figure 7:
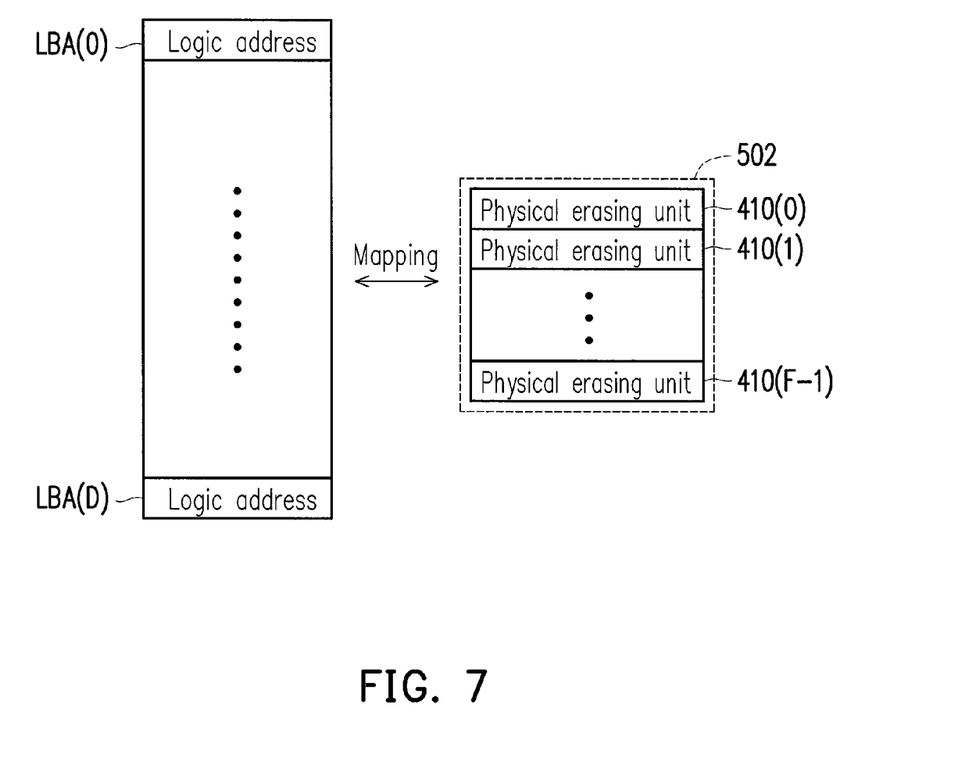

FIG. 6 and FIG. 7 are exemplary schematic diagrams of managing a physical erasing unit according to an exemplary embodiment of the invention.

With reference to FIG. 6, the memory management circuit 202 logically groups the physical erasing units 410(0) to 410(N) into a data area 502, a spare area 504, a system area 506 and a replacement area 508.

The physical erasing units logically belonging to the data area 502 and the spare area 504 are used for storing data from the host system 1000. To be specific, the physical erasing units belonging to the data area 502 are considered to have been used for storing data, and the physical erasing units belonging to the spare area 504 are used for substituting the physical erasing units belonging to the data area 502. Namely, when a write command and data to be written are received from the host system 1000, the memory management circuit 202 selects a physical erasing unit from spare area 504 and writes the data into the selected physical erasing unit for substituting the physical erasing units of the data area 502.

The physical erasing units logically belonging to the system area 506 are used for recording system data. For instance, the system data includes the manufacturers and models of the rewritable non-volatile memory module, the number of physical erasing units in the rewritable non-volatile memory modules, the number of physical programming units in each physical erasing unit, and so on.

The physical erasing units logically belonging to the replacement area 508 are used in a bad physical erasing unit replacement procedure for replacing damaged physical erasing units. Particularly, if there are still normal physical erasing units in the replacement area 508 while a physical erasing unit in the data area 502 is damaged, the memory management circuit 202 selects a normal physical erasing unit from the replacement area 508 to replace the damaged physical erasing unit.

In particular, the numbers of physical erasing units in the data area 502, the spare area 504, the system area 506 and the replacement area 508 vary with different memory module standards. Additionally, it has to be understood that the grouping relationships of grouping the physical erasing units into the data area 502, the spare area 504, the system area 506 and the replacement area 508 are dynamically changed during the operation of the memory storage device 100. For example, when a physical erasing unit in the spare area 504 is damaged and replaced by a physical erasing unit in the replacement area 508, the physical erasing unit in the replacement area 508 is associated with the spare area 504.

With reference to FIG. 7, the memory management circuit 202 configures a plurality of logical addresses LBA(0) to LBA(D) for data access to the physical erasing units stored with the data in the aforementioned alternating manner. For instance, when the memory storage device 100 is formatted by an operating system through a file system (e.g., FAT 32), the logic addresses LBA(0) to LBA(D) are respectively mapped to the physical erasing units 410(0) to 410(F−1) in the data area 502. For example, the memory management circuit 202 establishes a logic address-physical erasing unit mapping table to record a mapping relation between the logic addresses and the physical erasing units. In the present exemplary embodiment, the size of each of the logic addresses LBA(0) to LBA(D) is equal to the size of each of the physical erasing units 410(0) to 410(F−1), and the logic address be referred to as a logical block address (LBA). Additionally, in another exemplary embodiment, the size of each of the logic addresses LBA(0)-LBA(D) may also be the size of one physical programming unit or any other size, which does not construe any limitaions to the invention.

The memory management circuit 202 stores non-recovery data (which is referred to as first data hereinafter) in the NVRAM 208 and stores recovery data (which is referred to as second data hereinafter) in the VRAM 209. In the present exemplary embodiment, the first data includes the writing command from the host system 1000, user data, such as writing data corresponding to the writing command and system data corresponding to the writing data, such as a logic address obtained according to the writing command, and the second data includes the data read from the rewritable non-volatile memory module 106 and a management table of the rewritable non-volatile memory module 106, such as the logic address-physical erasing unit mapping table.

To be specific, the first data and the second data are classified depending on whether the data may be re-obtained from the rewritable non-volatile memory module 106. For example, after the power supply problem such as sudden power failure or unstable voltage supply occurs, if the data is capable of being re-obtained from the rewritable non-volatile memory module 106, such data is the second data. On the other hand, after the power supply problem such as sudden power failure or unstable voltage supply occurs, if the data is incapable of being re-obtained from the rewritable non-volatile memory module 106, such data is the first data. Additionally, in an exemplary embodiment, any other data that is difficult to be obtained from the rewritable non-volatile memory module 106 or is more important may be served as the first data and stored in the NVRAM 208.

For instance, when receiving a writing command from the host system 1000 and writing data corresponding to the writing command, the memory management circuit 202 obtains the logic address LBA(0) according to the writing command and the logic address LBA(0) is mapped to the physical erasing unit 410(0) in the rewritable non-volatile memory module 106. Then, the memory management circuit 202 stores the writing command, the writing data corresponding to the writing command and the logic address LBA(0) in the NVRAM 208 which is served as a buffer, and writes the writing data into the physical erasing unit 410(0) from the NVRAM 208.

In some scenarios, when the memory storage device 100 is re-powered on after a power failure or being power off, the memory management circuit 202 reads the writing data that is incompletely written from the NVRAM 208, so as to write a portion of the writing data that is incompletely written into the rewritable non-volatile memory module 106 or re-write all of the writing data into the rewritable non-volatile memory module 106.

For instance, when the memory storage device 100 is re-powered on after a power failure, the memory management circuit 202 determines whether a writing stage error corresponding to the writing data occurs. The writing stage error is an error such as an incomplete date writing operation that occurs during the process of the writing data being written into the rewritable non-volatile memory module 106 from the NVRAM 208 due to the power supply problem such as sudden power failure or unstable voltage supply.

For example, the memory management circuit 202 may determine whether the writing data stored in the NVRAM 208 is different from specific data in the rewritable non-volatile memory module 106. If the writing data stored in the NVRAM 208 is different from specific data in the rewritable non-volatile memory module 106, it indicates that at least a portion of the writing data not being written into the rewritable non-volatile memory module 106 is resulted from the writing stage error, and thus, the memory management circuit 202 determines that a writing stage error corresponding to the writing data occurs.

If determining that the writing stage error occurs, the memory management circuit 202 re-writes the portion of or all of the first data (e.g., the writing command, the writing data and the corresponding logic address) with respect to the writing stage error to the rewritable non-volatile memory module 106 from the NVRAM 208. That is to say, the first data stored in the NVRAM 208 is not lost due to the power supply problem such as power failure, and thus, even though an error (e.g., an accidental termination) occurs during the previous process of writing the data into the rewritable non-volatile memory module 106, the related writing procedure may still be completed when the memory storage device 100 is re-powered on after previously being powered off.

Moreover, a timing point for determining the writing stage error may also be any time when the memory storage device 100 is started up, booted up, re-provided with stable power or any time when the memory management circuit 202 has to check the writing state.

In an exemplary embodiment, the first data stored in the NVRAM 208 also includes a receiving state flag. The receiving state flag corresponds to a receiving state of the writing data from the host system 1000. By querying the receiving state flag, the memory management circuit 202 may learn whether the writing data from the host system 1000 is completely received by the NVRAM 208 and/or a receiving extent of the writing data. When the memory storage device 100 is re-powered on after a power failure, the memory management circuit 202 determines whether a receiving stage error corresponding to the writing data according to the receiving state flag. The receiving stage error causes at least a portion of or all of the writing data not being stored in the NVRAM 208. Namely, the receiving stage error is an error such as an incomplete data storing operation (e.g., the operation is accidentally terminated but the writing data is not yet completely transmitted to the NVRAM 208 from the host system 1000) that occurs during the process of the memory storage device 100 receiving the writing data from the host system 1000 and storing the writing data into the NVRAM 208 due to the power supply problem such as sudden power failure or unstable voltage supply.

If determining that the receiving stage error occurs, the memory management circuit 202 re-receives the complete writing data or the at least portion of the writing data that is not yet stored into the NVRAM 208 from the host system 1000. Alternatively, in an exemplary embodiment, the memory management circuit 202 discards the portion of the writing data that is stored but incompletely stored in the NVRAM 208 and may, for example, re-receive the complete writing data from the host system 1000. Similarly, a timing point for determining the receiving stage error may also be any time when the memory storage device 100 is started up, booted up, re-provided with stable power or any time when the memory management circuit 202 has to check the receiving state.

In an exemplary embodiment, the memory management circuit 202 further determines whether the previous power failure is an abnormal power failure according to an power-off state flag. Such abnormal power failure is, for example, an abnormal shutdown of the memory storage device 100 that occurs due to sudden power failure or unstable voltage supply. The power-off state flag is generated by the memory management circuit 202, for example, each time when the power failure or shutdown occurs in the memory storage device 100, or only when abnormal power failure occurs in the memory storage device 100. Additionally, the power-off state flag may be stored in the rewritable non-volatile memory module 106 and/or the NVRAM 208.

When determining that the previous power failure of the memory storage device 100 is an abnormal power failure, the memory management circuit 202 may read the first data from the NVRAM 208 to write the writing data that is incompletely written into the rewritable non-volatile memory module 106. Additionally, when determining that the previous power failure of the memory storage device 100 is an abnormal power failure, the memory management circuit 202 may further determine whether the aforementioned writing stage error occurs and re-write the writing data corresponding to the writing stage error into the rewritable non-volatile memory module 106 according to the first data in the NVRAM 208 when determining that the writing stage error occurs. Moreover, when determining that the previous power failure of the memory storage device 100 is an abnormal power failure, the memory management circuit 202 may also further determine whether the receiving stage error occurs and re-receive the writing data corresponding to the receiving stage error from the host system 1000 when the receiving stage error occurs.

Further, in an exemplary embodiment, the second data stored in the VRAM 209 also includes recycled data which is obtained by the memory management circuit 202 performing a garbage collection procedure on the rewritable non-volatile memory module 106. For example, in some specific time points (e.g., when the number of the physical erasing units in the spare area 504 is less than a specific number), the memory management circuit 202 performs a garbage collection procedure on the rewritable non-volatile memory module 106 to obtain recycled data from a plurality of physical erasing units in the rewritable non-volatile memory module 106 that requires garbage collection and store the recycled data in the VRAM 209. Namely, assumed that the garbage collection procedure is involved with the physical erasing units 410(0) to 410(F−1), the memory management circuit 202 serves data that is written into the physical erasing units 410(0) to 410(F−1) as the recycled data and stored the recycled data in the VRAM 209, instead of in the NVRAM 208. Thereby, even though a power supply problem such as sudden power failure or unstable voltage supply occurs and causes loss to the recycled data which is stored in the VRAM 209, the lost recycled data may still be easily re-obtained from the rewritable non-volatile memory module 106, without storing the recycled data by using the NVRAM 208 that costs higher.

In addition, regarding data management for the NVRAM 208, in the present exemplary embodiment, as long as the writing data from the host system 1000 is written into the rewritable non-volatile memory module 106, the writing data may be removed or overwritten. However, in an exemplary embodiment, if the rewritable non-volatile memory module 106 is an MLC NAND flash memory module, the writing data may not be removed or overwritten even though the writing data from the host system 1000 is written into the rewritable non-volatile memory module 106.

Generally, an MLC NAND flash memory module is capable of storing data of 2 bit in one memory cell. To be more specific, a plurality of memory cells on the same word line forms an upper physical programming unit and a lower physical programming unit, and 2 bits of each memory cell respectively belong to different physical programming units. That is, a plurality of physical programming units of each physical erasing unit is grouped into a plurality of lower physical programming units and a plurality of upper physical programming units. Herein, it is referred to that a lower physical programming unit and an upper physical programming unit on the same word line correspond to each other, which will not be repeatedly described hereinafter. A writing speed of a lower physical programming unit is typically faster than a writing speed of an upper physical programming unit, and a lower physical programming unit has to be programmed in advance of its corresponding upper physical programming unit being programmed. Similarly, the rewritable non-volatile memory module 106 may also be a TLC NAND flash memory module, any other flash memory module, or any other memory module with the same characteristics and thus, have the aforementioned properties.

Figure 8:
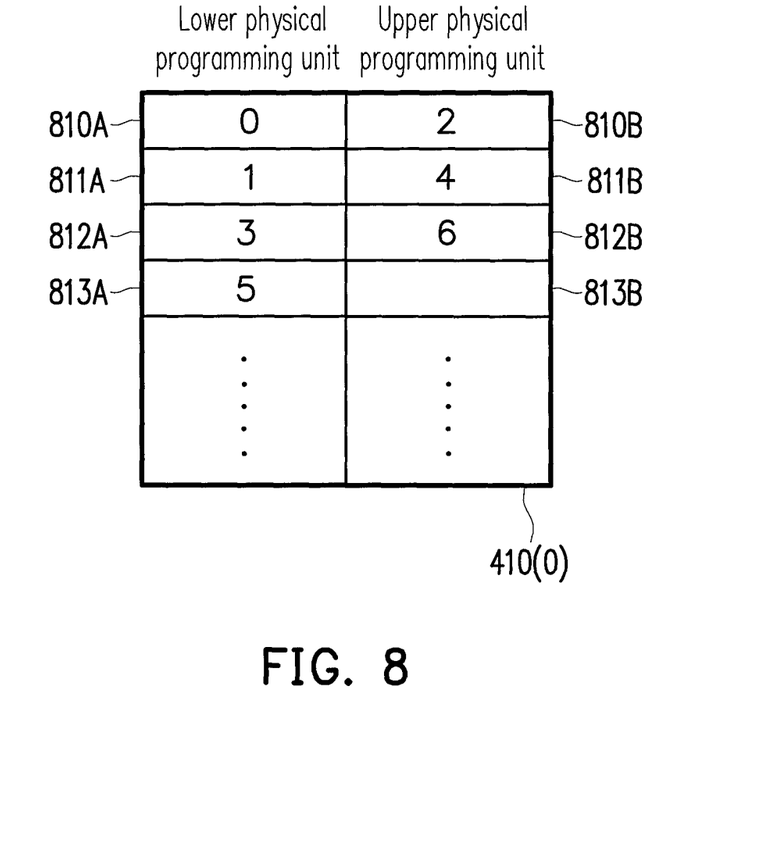
FIG. 8 is a schematic diagram illustrating a physical erasing unit according to an exemplary embodiment of the invention.

FIG. 8 is a schematic diagram illustrating a physical erasing unit according to an exemplary embodiment of the invention.

With reference to FIG. 8, in the present exemplary embodiment, the physical erasing unit 410(0) at least includes lower physical programming units 810A to 813A and upper physical programming units 810B to 813B. The lower physical programming unit 810A corresponds to the upper physical programming unit 810B, the lower physical programming unit 811A corresponds to the upper physical programming unit 811B and so on. In the present exemplary embodiment, the memory management circuit 202 alternatively writes data into one or more lower physical programming units and one or more upper physical programming units according to a programming sequence. For example, the numbers in the physical programming units illustrated in FIG. 8 indicate the programming sequence. To be specific, the lower physical programming units 810A and 811A are first programmed, and the upper physical programming unit 810B, the lower physical programming unit 812A, the upper physical programming unit 811B, the lower physical programming unit 813A and the upper physical programming unit 812B are then sequentially programmed, and so on. However, the memory management circuit 202 may also write data according to any other programming sequence. For example, data can be sequentially written into the lower physical programming unit 810A, the upper physical programming unit 810B, the lower physical programming unit 811A, the upper physical programming unit 811B and the lower physical programming unit 812A, or can be written according to the sequence of the lower physical programming units 810A, 811A, 812A, 813A and the upper physical programming units 810B, 811B and 812B, and so on, and the invention is not limited thereto.

In the present exemplary embodiment, after the writing data from the host system 1000 is written into the rewritable non-volatile memory module 106, the memory management circuit 202 also determines whether the upper physical programming unit corresponding to each lower physical programming unit for storing the writing data in the rewritable non-volatile memory module 106 has been used, e.g., whether the writing data or any other data has been written thereto. If yes, the memory management circuit 202 may set the writing data stored in the NVRAM 208 to be removable and/or overwritable, so that the writing data stored in the NVRAM 208 can be removed or overwritten to increase available space when other writing data is subsequently received from the host system 1000. Otherwise, if upper physical programming units corresponding to one or more lower physical programming units for storing the writing data in the rewritable non-volatile memory module 106 are not yet used, e.g., the writing data or other data is not written thereto, the memory management circuit 202 continuously maintains the writing command, the writing data corresponding to the writing command and the logic address that are stored in the NVRAM 208. For instance, if at least a portion of the writing data is stored in the lower physical programming units 810A, 811A, 812A, 813A and the upper physical programming units 810B, 811B and 812B, and no data is yet written into the upper physical programming unit 813B, the memory management circuit 202 continuously maintains the writing command, the writing data corresponding to the writing command and the logic address that are stored in the NVRAM 208. For example, the memory management circuit 202 may set the writing data stored in the NVRAM 208 to be irremovable and/or unoverwritable.

By doing so, even though the operation of writing data into the upper physical programming unit 813B or other programming issue causes affection to the lower physical programming unit 813A and leads to change in the data storing state of the lower physical programming unit 813A, the writing data stored in the NVRAM 208 may be used for performing check and recovery operations on the lower physical programming unit 813A any time.

Figure 9:
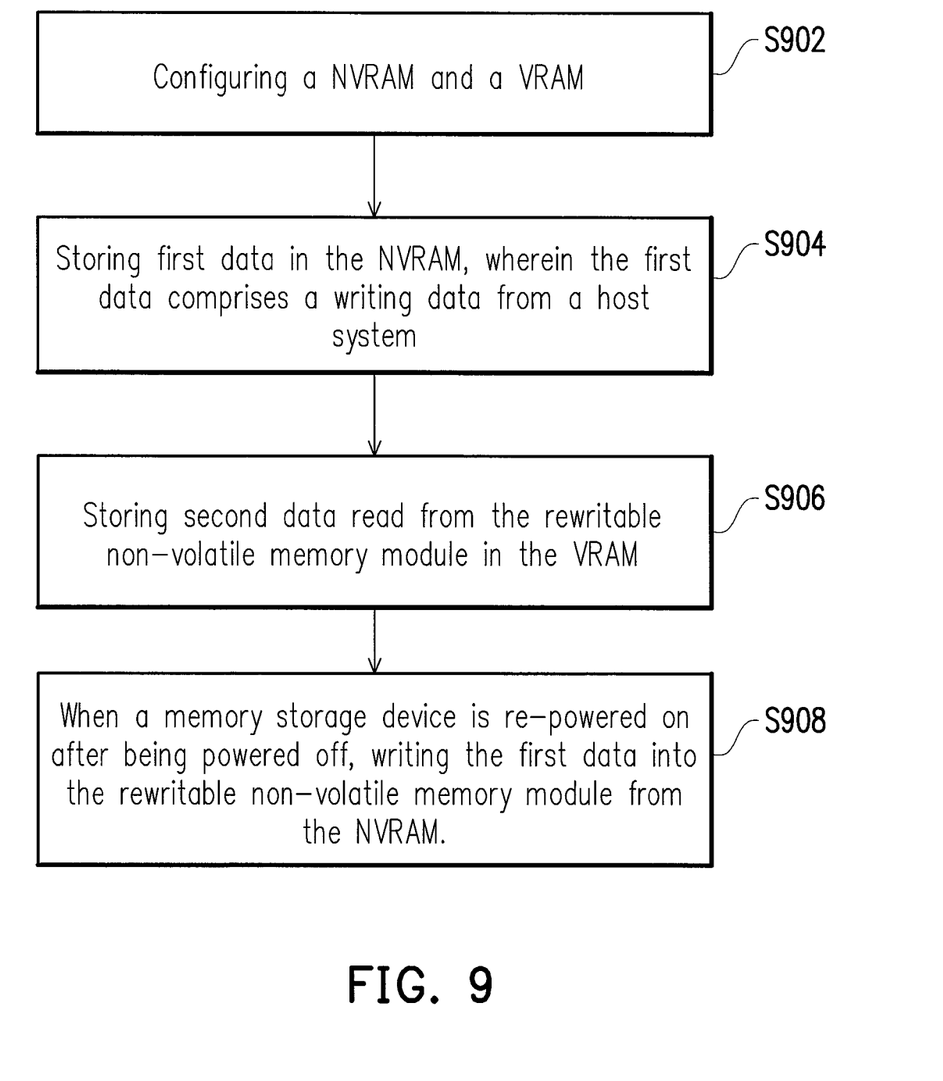
FIG. 9 is a flowchart of a method for data management according to an exemplary embodiment of the invention.

FIG. 9 is a flowchart of a method for data management according to an exemplary embodiment of the invention.

With reference to FIG. 9, in step S902, configuring the memory control circuit unit 104 (or the memory management circuit 202), the NVRAM 208 and the VRAM 209.

In step S904, the memory control circuit unit 104 (or the memory management circuit 202) stores the first data in the NVRAM 208. The first data includes the writing data from the host system 1000.

In step S906, the memory control circuit unit 104 (or the memory management circuit 202) stores the second data read from the rewritable non-volatile memory module 106 in the VRAM 209.

In step S908, when the memory storage device is re-powered up after a power failure or being power off, the memory control circuit unit 104 (or the memory management circuit 202) writes the first data into the rewritable non-volatile memory module 106 from the NVRAM 208.

It is to be noted that the performing sequence of step S904 and step S906 is not limited in the present invention, and each step in FIG. 9 may be implemented as a plurality of program codes or circuits. Moreover, the method for data management illustrated in FIG. 9 may can be performed independently or along with any embodiment described above, which is not limited in the present invention.

In view of above, as proposed in the exemplary embodiments of the invention, only the data (e.g., the writing command from the host system, the writing data corresponding to the writing command and the logic address) that is important or is difficult to be re-obtained from the rewritable non-volatile memory module is stored in the NVRAM, and the other data (e.g., the logic address-physical erasing unit mapping table, the recycled data of the garbage collection procedure and so on) that need more storage space and can be re-obtained from the rewritable non-volatile memory module is stored in VRAM. In this way, the demand for the capacity of the NVRAM can be effectively reduced while the data access performance can be maintained as well. When the power supply problem such as sudden power failure or unstable voltage supply occurs, even though the data stored in the VRAM may be lost, the data stored in the NVRAM can still be used after the memory storage device is re-powered on, so as to complete or re-perform the data storing and/or writing operation. Moreover, the data lost in the VRAM can be re-read from the rewritable non-volatile memory module.

That is, as proposed in the invention, the NVRAM with higher cost is used along with the VRAM with lower cost, such that both the demand for the capacity of the NVRAM and the manufacturing cost of the overall memory storage device can be reduced. Moreover, as proposed in the invention, the long-standing trouble that the unrecoverable writing error occurs in the memory storage device due to the power supply problem such as sudden power failure or unstable voltage supply can be improved. The previously described exemplary embodiments of the invention have the advantages aforementioned, wherein the advantages aforementioned not required in all versions of the invention.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A method for data management, for a memory control circuit unit configured to control a rewritable non-volatile memory module, the method comprising:

configuring a non-volatile random access memory (NVRAM) and a volatile random access memory (VRAM);

storing first data in the NVRAM, wherein the first data comprises writing data from a host system and specific data read from the rewritable non-volatile memory module;

storing second data read from the rewritable non-volatile memory module in the VRAM;

when a memory storage device is re-powered on after a power failure, writing the first data into the rewritable non-volatile memory module from the NVRAM; and maintaining continuously the writing data stored in the NVRAM when at least a portion of the writing data is stored in a first lower physical programming unit of the rewritable non-volatile memory module and data is not yet written to a first upper physical programming unit of the rewritable non-volatile memory module corresponding to the first lower physical programming unit, wherein the step of storing the second data read from the rewritable non-volatile memory module in the VRAM comprises:

performing a garbage collection procedure on the rewritable non-volatile memory module to obtain a recycled data from a plurality of physical erasing units of the rewritable non-volatile memory module; and storing the recycled data in the VRAM, not in the NVRAM.

2. The method according to claim 1, wherein the first data further comprises at least one logic address and a writing command from the host system, the at least one logic address is mapped to at least one physical erasing unit of the rewritable non-volatile memory module, and the step of storing the first data in the NVRAM comprises:

receiving the writing command from the host system and the writing data corresponding to the writing command, and obtaining the at least one logic address according to the writing command;

storing the writing command, the writing data corresponding to the writing command and the at least one logic address in the NVRAM; and writing the writing data into the at least one physical erasing unit of the rewritable non-volatile memory module from the NVRAM.

3. The method according to claim 2, wherein the at least one physical erasing unit comprises a plurality of lower physical programming units and a plurality of upper physical programming units corresponding to the plurality of lower physical programming units, and the method further comprises:

when at least the portion of the writing data is stored in the first lower physical programming unit of the plurality of lower physical programming units, and data is not yet written to the first upper physical programming unit corresponding to the first lower physical programming unit, continuously maintaining the writing command, the writing data and the at least one logic address which are stored in the NVRAM.

4. The method according to claim 1, wherein the step of writing the first data into the rewritable non-volatile memory module from the NVRAM when the memory storage device is re-powered on after the power failure comprises:
determining whether a writing stage error corresponding to the writing data occurs, wherein the writing stage error causes at least a portion or all of the first data not being written into the rewritable non-volatile memory module; and
if the writing stage error occurs, writing the at least the portion of or all of the first data into the rewritable non-volatile memory module.

5. The method according to claim 4, wherein the step of determining whether the writing stage error corresponding to the writing data occurs comprises:
determining whether the writing data stored in the NVRAM is different from a specific data in the rewritable non-volatile memory module; and
if the writing data stored in the NVRAM is different from the specific data in the rewritable non-volatile memory module, determining that the writing stage error corresponding to the writing data occurs.

6. The method according to claim 1, wherein the first data further comprises a receiving state flag corresponding to a receiving state of the writing data, and the step of writing the first data into the rewritable non-volatile memory module from the NVRAM when the memory storage device is re-powered on after the power failure comprises:
determining whether a receiving stage error corresponding to the writing data occurs according to the receiving state flag, wherein the receiving stage error causes at least a portion of or all of the first data not being stored in the NVRAM; and
if the receiving stage error occurs, re-receiving the at least the portion of or all of the first data from the host system.

7. The method according to claim 1, wherein the step of writing the first data into the rewritable non-volatile memory module from the NVRAM when the memory storage device is re-powered on after the power failure comprises:
determining whether the power failure is an abnormal power failure according to a power-off state flag, wherein the power-off state flag is stored in the rewritable non-volatile memory module and/or the NVRAM; and
when the power failure is the abnormal power failure, writing the first data to the rewritable non-volatile memory module from the NVRAM.

8. The method according to claim 1, wherein the second data comprises a logic address-physical erasing unit mapping table recording a mapping relationship between a plurality of logic addresses and a plurality of physical erasing units of the rewritable non-volatile memory module.

9. A memory storage device, comprising:
a connection interface unit, configured to be coupled to a host system;
a rewritable non-volatile memory module;
a non-volatile random access memory (NVRAM);
a volatile random access memory (VRAM); and
a memory control circuit unit, coupled to the connection interface unit, the NVRAM, the VRAM and the rewritable non-volatile memory module, wherein the memory control circuit unit is configured to store first data in the NVRAM, wherein the first data comprises writing data from the host system and specific data read from the rewritable non-volatile memory module,
the memory control circuit unit is further configured to store second data read from the rewritable non-volatile memory module in the VRAM,
when the memory storage device is re-powered on after a power failure, the memory control circuit unit is further configured to write the first data into the rewritable non-volatile memory module from the NVRAM,
the memory control circuit unit is further configured to continuously maintain the writing data stored in the NVRAM when at least a portion of the writing data is stored in a first lower physical programming unit of the rewritable non-volatile memory module and no data is written yet to a first upper physical programming unit of the rewritable non-volatile memory module corresponding to the first lower physical programming unit,
the memory control circuit unit is further configured to perform a garbage collection procedure on the rewritable non-volatile memory module to obtain a recycled data from a plurality of physical erasing units of the rewritable non-volatile memory module, and
the memory control circuit unit is further configured to store the recycled data in the VRAM, not in the NVRAM.

10. The memory storage device according to claim 9, wherein the first data further comprises at least one logic address and a writing command from the host system, the at least one logic address is mapped to at least one physical erasing unit of the rewritable non-volatile memory module, and the operation for the memory control circuit unit to store the first data in the NVRAM comprises:
receiving the writing command from the host system and the writing data corresponding to the writing command, and obtaining the at least one logic address according to the writing command;
storing the writing command, the writing data corresponding to the writing command and the at least one logic address in the NVRAM; and
writing the writing data into the at least one physical erasing unit of the rewritable non-volatile memory module from the NVRAM.

11. The memory storage device according to claim 10, wherein the at least one physical erasing unit comprises a plurality of lower physical programming units and a plurality of upper physical programming units corresponding to the plurality of lower physical programming units, and
when at least the portion of the writing data is stored in the first lower physical programming unit of the plurality of lower physical programming units, and no data is written yet to the first upper physical programming unit corresponding to the first lower physical programming unit, the memory control circuit unit is further configured to continuously maintain the writing command, the writing data and the at least one logic address which are stored in the NVRAM.

12. The memory storage device according to claim 9, wherein the memory control circuit unit is further configured to determine whether a writing stage error corresponding to the writing data occurs, wherein the writing stage error causes at least a portion or all of the first data not being written into the rewritable non-volatile memory module, and
if the writing stage error occurs, the memory control circuit unit is further configured to write the at least the portion of or all of the first data into the rewritable non-volatile memory module.

13. The memory storage device according to claim 12, wherein the memory control circuit unit is further configured to determines whether the writing data stored in the NVRAM is different from a specific data in the rewritable non-volatile memory module, and
if the writing data stored in the NVRAM is different from the specific data in the rewritable non-volatile memory module, the memory control circuit unit determines that the writing stage error corresponding to the writing data occurs.

14. The memory storage device according to claim 9, wherein the first data further comprises a receiving state flag corresponding to a receiving state of the writing data,
the memory control circuit unit is further configured to determine whether a receiving stage error corresponding to the writing data occurs according to the receiving state flag, wherein the receiving stage error causes at least a portion of or all of the first data not being stored in the NVRAM, and
if the receiving stage error occurs, the memory control circuit unit is further configured to re-receive the at least the portion of or all of the first data from the host system.

15. The memory storage device according to claim 9, wherein the memory control circuit unit is further configured to determine whether the power failure is an abnormal power failure according to a power-off state flag, wherein the power-off state flag is stored in the rewritable non-volatile memory module and/or the NVRAM, and
when the power failure is the abnormal power failure, the memory control circuit unit is further configured to write the first data to the rewritable non-volatile memory module from the NVRAM.

16. The memory storage device according to claim 9, wherein the second data comprises a logic address-physical erasing unit mapping table recording a mapping relationship between a plurality of logic addresses and a plurality of physical erasing units of the rewritable non-volatile memory module.

17. The memory storage device according to claim 9, wherein a capacity of the VRAM is at least twice as big as a capacity of the NVRAM.

18. A memory control circuit unit, configured to control a rewritable non-volatile memory module, the memory control circuit unit comprising:
a host interface, configured to be coupled to a host system;
a memory interface, configured to be coupled to the rewritable non-volatile memory module;
a non-volatile random access memory (NVRAM);
a volatile random access memory (VRAM); and
a memory management circuit, coupled to the host interface, the memory interface, the NVRAM, the VRAM and the rewritable non-volatile memory module, wherein
the memory management circuit is configured to store first data in the NVRAM, wherein the first data comprises writing data from the host system and specific data read from the rewritable non-volatile memory module,
the memory management circuit is further configured to store second data read from the rewritable non-volatile memory module in the VRAM,
when a memory storage device is re-powered on after a power failure, the memory management circuit is further configured to write the first data into the rewritable non-volatile memory module from the NVRAM,
the memory management circuit is further configured to continuously maintain the writing data stored in the NVRAM when at least a portion of the writing data is stored in a first lower physical programming unit of the rewritable non-volatile memory module and no data is written yet to a first upper physical programming unit of the rewritable non-volatile memory module corresponding to the first lower physical programming unit,
the memory management circuit is further configured to perform a garbage collection procedure on the rewritable non-volatile memory module to obtain a recycled data from a plurality of physical erasing units of the rewritable non-volatile memory module, and
the memory management circuit is further configured to store the recycled data in the VRAM, not in the NVRAM.

19. The memory control circuit unit according to claim 18, wherein the first data further comprises at least one logic address and a writing command from the host system, the at least one logic address is mapped to at least one physical erasing unit of the rewritable non-volatile memory module, and the operation for the memory management circuit to store the first data in the NVRAM comprises:
receiving the writing command from the host system and the writing data corresponding to the writing command, and obtaining the at least one logic address according to the writing command;
storing the writing command, the writing data corresponding to the writing command and the at least one logic address in the NVRAM, and
writing the writing data into the at least one physical erasing unit of the rewritable non-volatile memory module from the NVRAM.

20. The memory control circuit unit according to claim 19, wherein the at least one physical erasing unit comprises a plurality of lower physical programming units and a plurality of upper physical programming units corresponding to the plurality of lower physical programming units, and
when at least the portion of the writing data is stored in the first lower physical programming unit of the plurality of lower physical programming units, and no data is written yet to the first upper physical programming unit corresponding to the first lower physical programming unit, the memory management circuit is further configured to continuously maintain the writing command, the writing data and the at least one logic address which are stored in the NVRAM.

21. The memory control circuit unit according to claim 18, wherein the memory management circuit is further configured to determine whether a writing stage error corresponding to the writing data occurs, wherein the writing stage error causes at least a portion or all of the first data not being written into the rewritable non-volatile memory module, and
if the writing stage error occurs, the memory management circuit is further configured to write the at least the portion of or all of the first data into the rewritable non-volatile memory module.

22. The memory control circuit unit according to claim 18, wherein the first data further comprises a receiving state flag corresponding to a receiving state of the writing data,
the memory management circuit is further configured to determine whether a receiving stage error corresponding to the writing data occurs according to the receiving state flag, wherein the receiving stage error causes at least a portion of or all of the first data not being stored in the NVRAM, and if the receiving stage error occurs, the memory management circuit is further configured to re-receive the at least the portion of or all of the first data from the host system.

23. The memory control circuit unit according to claim 18, wherein the memory control circuit unit is further configured to determine whether the power failure is an abnormal power failure according to a power-off state flag, wherein the power-off state flag is stored in the rewritable non-volatile memory module and/or the NVRAM, and when the power failure is the abnormal power failure, the memory management circuit is further configured to write the first data to the rewritable non-volatile memory module from the NVRAM.

* * * * *